Figure 1:
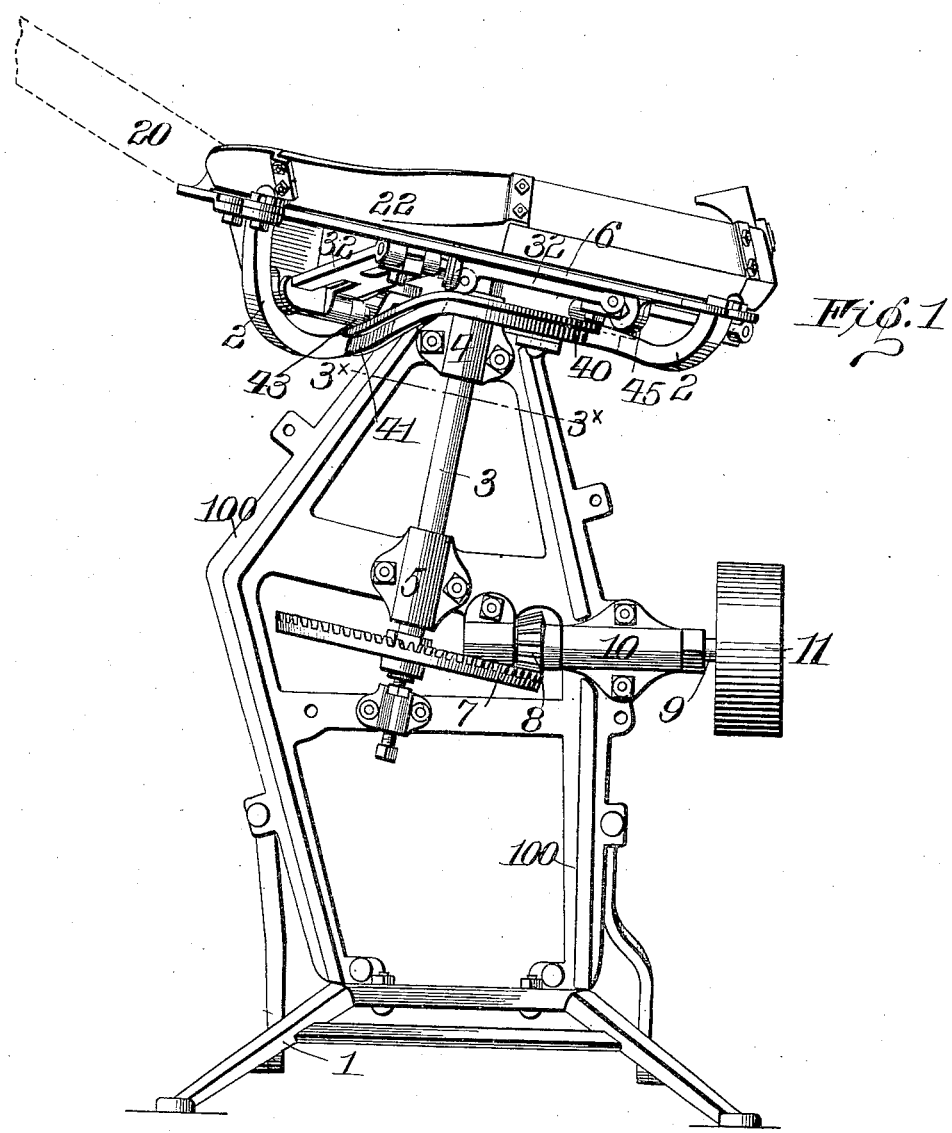

No. 862,821. PATENTED AUG. 6, 1907.
C. M. HEFFRON.
FRUIT SLICING MACHINE.
APPLICATION FILED SEPT. 26, 1902.

3 SHEETS—SHEET 2.

WITNESSES:
Walter B. Payne.
G. Willard Rich.

INVENTOR
Cassius M. Heffron
BY
Frederick G. Church
His ATTORNEY.

No. 862,821. PATENTED AUG. 6, 1907.
C. M. HEFFRON.
FRUIT SLICING MACHINE.
APPLICATION FILED SEPT. 26, 1902.

3 SHEETS—SHEET 3.

WITNESSES:
Walter B. Payne
G. Willard Rich

INVENTOR
Cassius M. Heffron
BY
Frederick S. Church
his ATTORNEY.

UNITED STATES PATENT OFFICE.

CASSIUS M. HEFFRON, OF ROCHESTER, NEW YORK.

FRUIT-SLICING MACHINE.

No. 862,821.   Specification of Letters Patent.   Patented Aug. 6, 1907.

Application filed September 26, 1902. Serial No. 124,893.

*To all whom it may concern:*

Be it known that I, CASSIUS M. HEFFRON, of Rochester, in the county of Monroe and State of New York, have invented certain new and useful Improvements in Fruit-Slicing Machines; and I do hereby declare the following to be a full, clear, and exact description of the same, reference being had to the accompanying drawings, forming a part of this specification, and to the reference numerals marked thereon.

My present invention has for its object to provide a machine for slicing fruit or vegetables and one which is especially adapted for slicing fruit such as apples which are previously cored, and it has for its further object to provide means whereby such fruit or vegetables may be automatically positioned as they are fed promiscuously into the machine and presented to the slicing knives in such a manner that perfectly formed ring slices may be cut.

To these and other ends my invention further consists in certain improvements in construction and combinations of parts all as will be more fully described and the novel features pointed out in the claims at the end of the specification.

Figure 2:
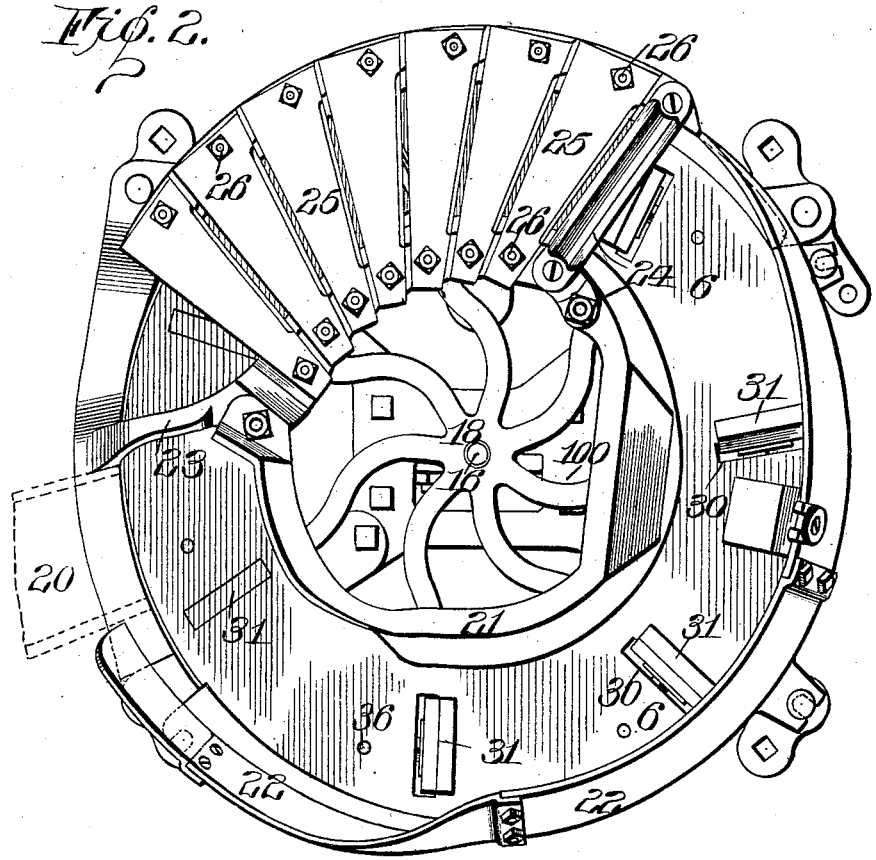
Figure 6:
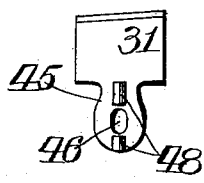
Figure 5:
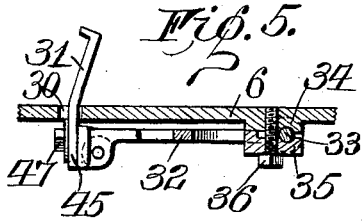
Figure 7:
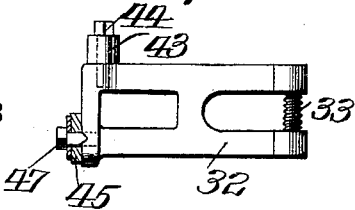
Figure 3:
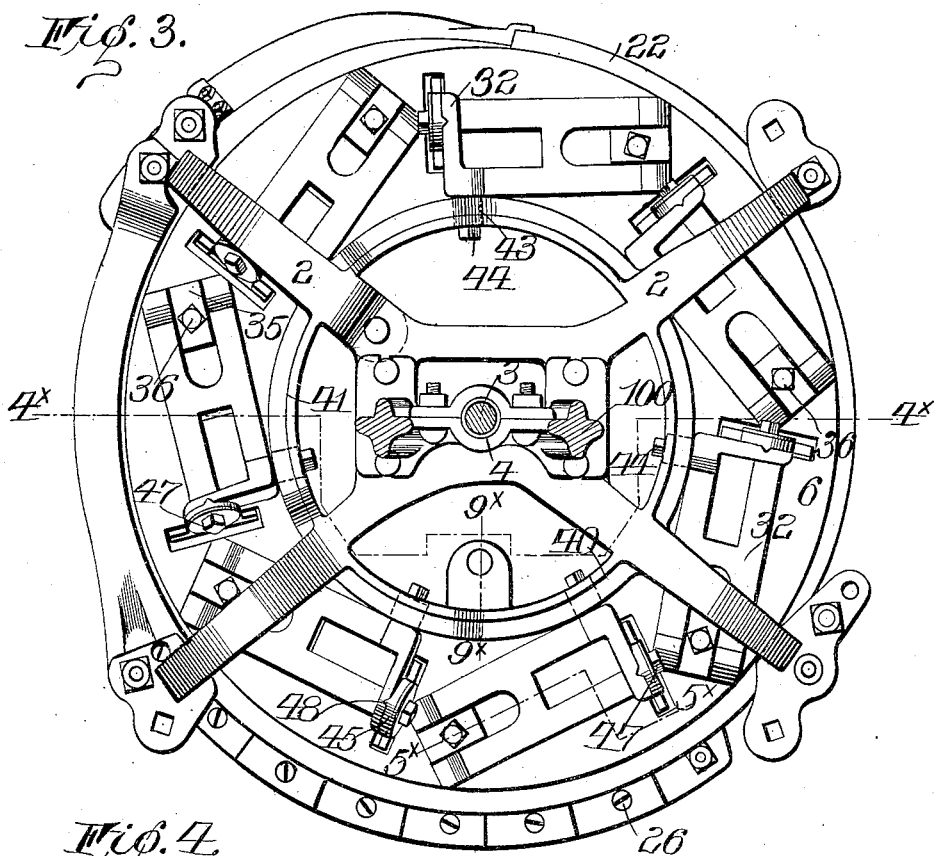
Figures 4, 9:
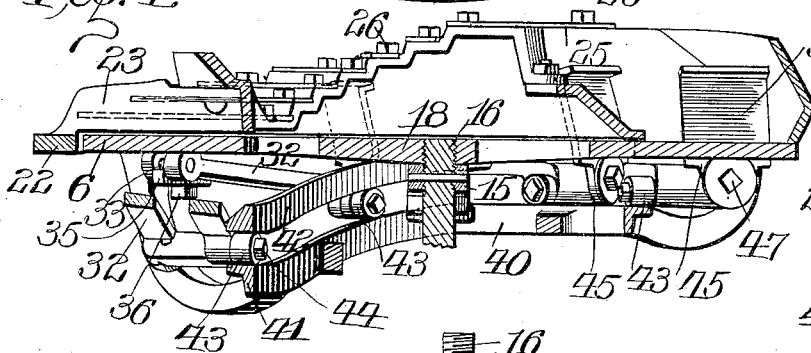
Figure 8:
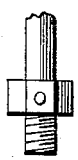

In the drawings: Figure 1, is a side elevation of a slicing machine constructed in accordance with my invention. Fig. 2, is a plan view thereof. Fig. 3, is a bottom plan view of the table looking upward from the line 3×—3× of Fig. 1. Fig. 4, is a sectional view on the line 4×—4× of Fig. 3. Fig. 5, is a sectional view on the line 5×—5× of Fig. 3. Fig. 6, is an end view of one of the pusher heads. Fig. 7, is a detail view of one of the pusher supporting arms. Fig. 8, is a side elevation of the shaft, and Fig. 9, is a sectional view on the line 9×—9× of Fig. 3 showing a portion of the cam slot.

Similar reference numerals in the several figures indicate similar parts.

In the present instance I have shown my invention applied to the general type of fruit slicing machines, shown and described in a previous application filed by me December 26th, 1901, Serial No. 87,144, and it embodies generally a main frame having the base 1 and an upright portion 100 thereon to which is attached at its upper end a supplemental frame composed of the outwardly extending arms 2. Arranged centrally in the portion 100 of the main frame is a shaft 3 supported in bearings 4 and 5 and carrying at its upper end a rotary platform or fruit support 6. At the lower end the shaft is provided with a bevel gear wheel 7 with which meshes a bevel pinion 8 mounted on the shaft 9, supported in bearings 10, on the frame, and provided with a driving pulley 11. The upper end of the shaft 3 is provided with a collar or shoulder 15 and the threaded end 16 by means of which it is secured to the hub 18 of the platform 6 upon which the fruit is supported as it is moved into contact with the slicing knives.

As shown in Fig. 1 the platform or support is inclined slightly to the horizontal plane so that the fruit which is delivered from a chute or hopper 20 at its upper side will be caused to roll as it drops upon the platform and in order to retain the fruit thereon I employ inner and outer guard rings or rails 21 and 22 the latter being supported upon the arms 2 of the supplemental frame and which is warped or twisted throughout its length to cause the fruit as it engages therewith to be rolled or tumbled until it comes to a position of rest upon one its ends which are somewhat flattened by the coring operation to which the fruit is previously subjected. The inner ring is arranged above the table and is supported independently thereof by means of arms 23 and 24 extending inwardly from the outer ring and between these arms are arranged a series of stepped knife blades 25 attached at their ends to the inner and outer rings by bolts 26.

The fruit received upon the table is forced through the slicing knives 25 by means of pushers or heads and as the knives are stepped relatively to the face of the platform I provide a construction of the parts whereby the heads are retracted as they advance towards the knives. Provided in the outer edge of the platform or support are radially extending elongated apertures 30 through which extend pusher heads 31 mounted upon the end of the supporting arms or levers 32 pivoted at their forward ends. As a convenient method of construction I bifurcate the forward end of the lever or arm 32 and support between the arms, thus formed, journal pins 33 and each of these pins are engaged between a filler block or boss 34 arranged upon or formed integrally with the lower side of the platform 6, and a detachable clamping piece or journal block 35 secured in position by a small bolt 36, said filler block and clamping piece being provided with segmental recesses adapted to form a journal for the pin. The pins 33 are provided with a screw thread, as shown in Fig. 7, which forms a convenient method of securing them in the lever arms and the channel formed by said screw thread provides means for retaining a lubricant for the pins. The vertical movement of the heads 31 is accomplished by means of a cam ring 40 the upper surface of which is parallel with the top of the table or platform except that portion beneath the slicing knives where it extends downwardly as indicated at 41 in Figs. 1 and 4 and at this point there is arranged a secondary cam ring 42 as will be further explained. The rear ends of the levers 32 are provided at one side with rollers 43 journaled upon a stud or bolt 44 and adapted to travel upon the cam ring 40 and while the weight of the arms and the heads 31 thereon are sufficient to cause them to follow the cam track it is desirable to prevent any accidental cramping or binding of the parts by providing the secondary cam ring 42 which as the heads pass beneath the slicing knives positively cause them to be retracted, as shown in Fig. 4. In order that the pusher heads may be capable of adjustment relative to the knives 25 I provide upon the lower end of each an extension 45 provided with an elongated aperture 46 through which is passed a bolt 47 securing it to the arm 32 and to prevent the head from swinging or tilting on the arm I arrange at the upper and lower sides of the aperture 46 a V-shaped lug or projection 48 adapted to engage in a similar shaped recess in the arm so that when the bolt 47 is tightened the parts are securely positioned.

The operation of the device will now be readily understood. The prepared fruit supplied to the upper side of the constantly revolving platform or support engages one or the other of the tumbling rings 21 or 22 when its forward movement is somewhat arrested and the table passing beneath it causes the fruit to be rolled until it is properly positioned upon one of its flattened ends in front of one of the pusher heads 31, by means of which it is forced through the knives and cut into perfectly formed ring slices. The rollers 43 on the lever arms engaging beneath the secondary cam ring 42 cause the heads 31 to be positively retracted beneath the support as they are carried by the latter beneath the knives.

A slicing machine constructed in accordance with my invention may be used for slicing any kind of fruit or vegetables and the construction of the parts is such that the device may be easily assembled and worn or broken parts thereof easily repaired or replaced. By constructing the cam ring 41 integrally with the arms 2 of the supplemental frame a simple and very rigid construction is obtained and by supporting the pusher heads on the arms which are pivotally attached to the support these parts may be assembled upon the latter and the support positioned by attaching it to the threaded end of the shaft 3.

I claim as my invention:

1. In a slicing machine, the combination with a main frame comprising a central upright portion having bearings, an upwardly-extending shaft journaled therein, a support mounted on the shaft and means for revolving it, of a supplemental frame supported on the main frame comprising arms extending outwardly from the main frame beneath the support, a guard ring surrounding the revoluble support, a cam track supported on the arms of the supplemental frame, movable pusher heads carried on the support and coöperating with the cam track and slicing knives located above the support.

2. In a slicing machine, the combination with a main frame comprising a central upright portion having bearings, an upwardly extending shaft journaled therein, a support mounted on the shaft and means for revolving it, of a supplemental frame supported on the main frame comprising arms extending outwardly beneath the support and a ring guard projecting above and surrounding the support, a central ring located above the support and supported from the supplemental frame and slicing knives connecting it to the ring of the supplemental frame, a cam track located on said frame beneath the support and vertically movable heads carried on the latter and coöperating with said cam track.

3. In a slicing machine, the combination with a main frame embodying the base and an upright portion extending therefrom and provided with bearings, a supplemental frame secured to said portion, outwardly extending arms on the frame and a cam track formed integrally with said arms, of an upwardly extending shaft journaled in the bearings, a support secured thereto and a guard surrounding the latter and carried on the arms on said supplemental frame, slicing knives mounted on the frame and arranged above the support, vertically movable heads carried on the latter and means engaging the cam track to operate said heads vertically.

4. In a slicing machine, the combination with a frame, a revoluble support thereon and slicing knives, of a cam ring on the frame, a plurality of arms each having a journal pin, and clamping blocks engaging said pins and secured to the support, heads on the arms and projections on the latter engaging the cam.

5. In a slicing machine, the combination with a frame, a revoluble support thereon, means for operating it, slicing knives arranged above the support, and a cam ring arranged beneath the latter, of a plurality of arms each having a bifurcated end and provided with a journal pin secured in said end, journal blocks engaging said pins and attached to the support, heads on the arms operating through the latter and rollers on the arms engaging the cam ring.

6. The combination with a frame having bearings thereon, a shaft mounted therein provided with a fruit support and having a gear wheel, a pinion meshing with the latter and means for operating it to revolve the support, of a supplemental frame mounted on the main frame having outwardly extending arms, a guard detachably secured to the arms and extending above and surrounding the support and slicing knives secured to the guard, a cam ring mounted on the supplemental frame beneath the support, arms pivoted to the lower side of the latter and having projections engaging the cam ring and pusher heads secured to the arms operating through the support.

7. In a slicing machine, the combination with a platform, means for operating it and slicing knives, of an arm having a journal pin provided with a screw thread adapted to contain a lubricant between its adjacent convolutions, a bearing on the platform in which said pin is mounted, a cam engaging the lever and a head on the latter.

8. In a slicing machine, the combination with a frame, a rotary platform thereon, stationary slicing knives arranged above it and a cam ring arranged below the platform, of arms pivoted to the platform and engaging the cam and heads adjustably secured to the arms whereby they may be positioned on the arms relatively to the slicing knives.

CASSIUS M. HEFFRON.

Witnesses:
G. WILLARD RICH,
WALTER B. PAYNE.